E. WITT.
POWER TRANSMISSION.
APPLICATION FILED AUG. 24, 1916, RENEWED MAR. 10, 1919.
1,300,910.
Patented Apr. 15, 1919.
2 SHEETS—SHEET 1.
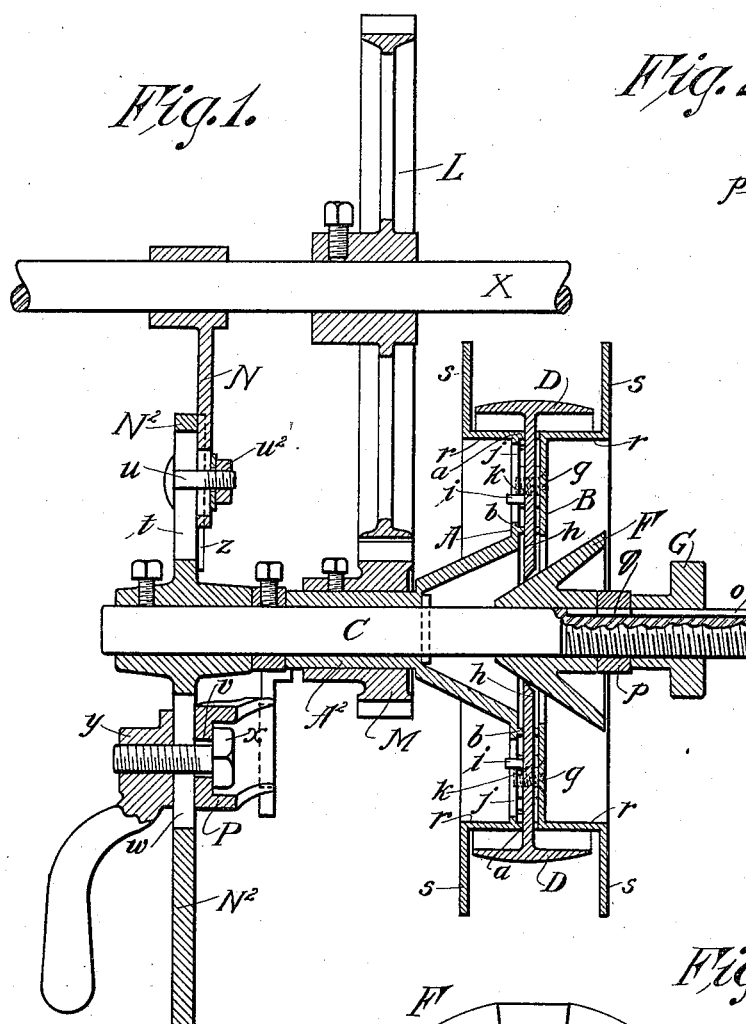
WITNESS:
INVENTOR,
Edward Witt,
BY
ATTORNEY.

E. WITT.
POWER TRANSMISSION.
APPLICATION FILED AUG. 24, 1916, RENEWED MAR. 10, 1919.
1,300,910.
Patented Apr. 15, 1919.
2 SHEETS—SHEET 2.
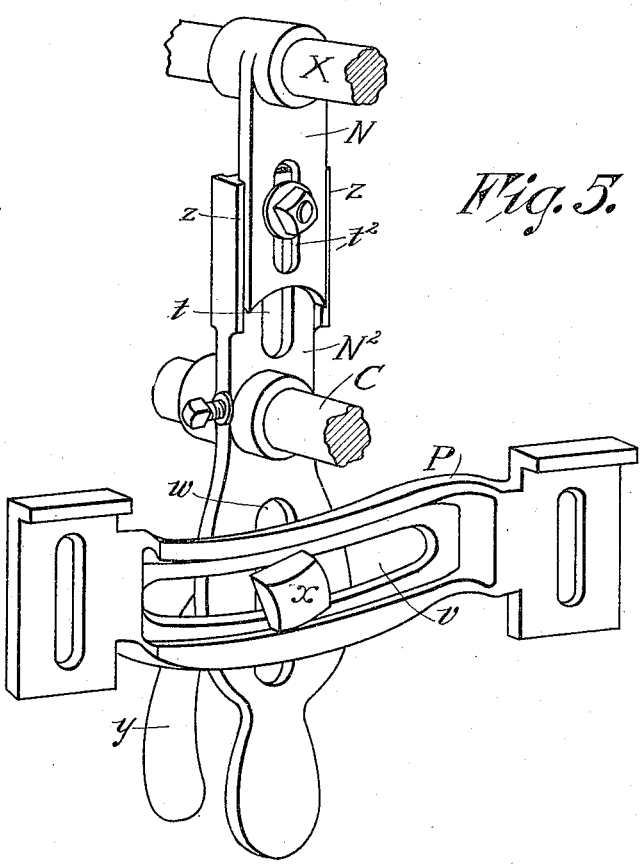
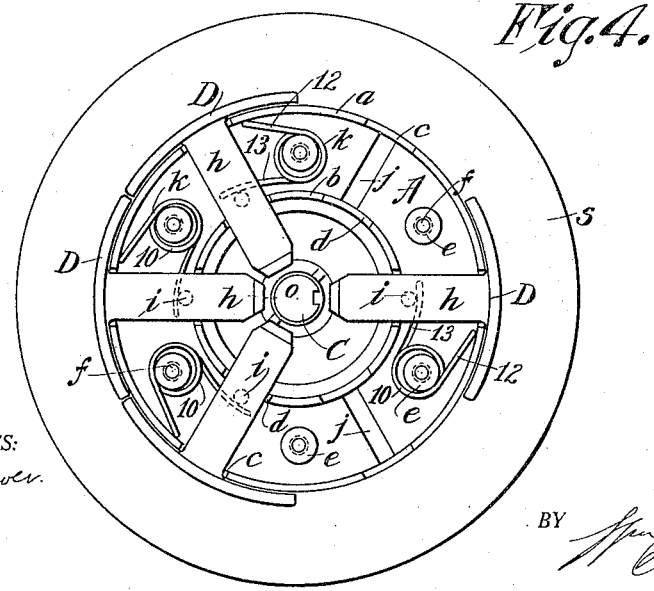
INVENTOR,
Edward Witt,
BY
ATTORNEY.

UNITED STATES PATENT OFFICE.

EDWARD WITT, OF NEWPORT, NEW HAMPSHIRE.

POWER TRANSMISSION.

1,300,910.  Specification of Letters Patent.  Patented Apr. 15, 1919.

Application filed August 24, 1916, Serial No. 116,724. Renewed March 10, 1919. Serial No. 281,815.

*To all whom it may concern:*

Be it known that I, EDWARD WITT, a citizen of the United States of America, and resident of Newport, in the county of Sullivan and State of New Hampshire, have invented certain new and useful Improvements in Power Transmissions, of which the following is a full, clear, and exact description.

This invention relates to an expansible pulley and to adjustable means on which it is mounted or supported, whereby the slackening of the belt, or the undue tightening of the belt by which the pulley is driven may be compensated for when the pulley is contracted or expanded.

The invention is described in conjunction with the accompanying drawings and is set forth in the claims.

In the drawings:—

Figure 1 is a sectional view taken vertically through the expansible pulley on the plane of its axis and through the adjustable support therefor, and showing the pulley in driving connection with a fixed shaft of a machine.

Figs. 2 and 3 are end views, on enlarged scales, of members comprised in the improved pulley, to be hereinafter more particularly referred to.

Fig. 4 is a face view of the expansible pulley as seen with the front half section of its body removed.

Fig. 5 is a perspective view showing the adjustable support for the pulley.

The body of the pulley comprises separable sections A and B,—the section A having an extended sleeve-like hub A² by which it is supported on a stud or carrying shaft C therefor.

The section A of the body of the pulley is made on its face, opposite the sleeve hub A² with concentric outer and inner flanges *a* and *b*.

These flanges have guide recesses *c* and *d* formed therein in radial lines and in uniformly spaced arrangement around the circular section A.

The said section A has bosses *e* cast on its face between the radial lines of arrangement of the guide recesses *c* and *d*, which bosses are provided with screw threaded holes *f*.

The second section B of the pulley body is of flat annular form corresponding to the section A, and is matched therewith, but spaced therefrom by the said flanges *a* and *b*; and such section is attached by screws *g*, the shanks of which have thread engagements in the aforementioned bosses *e*.

D D represent a series of rim forming segments having radial shank members *h* which are guided, for their sliding movements in the recesses *c* and *d* formed in the flanges *a* and *b*, said shanks having space for their occupancy in the comparatively narrow chamber between the annular sections A and B of the pulley body; and the said shanks *h* of the rim forming segments have the inner ends of all thereof terminated within a circle concentric with the shaft C.

The segments D carried at the outer ends of the shanks *h* are widened oppositely from the plane of arrangement of the shanks, and are preferably crowned or of convex form to retain the belt on the pulley.

The shank members of the segments are provided with transversely extended studs *i*, projected from their rear sides and extending into or through slots *j* in the disk like section A of the pulley body, which slots are provided to afford clearance for the free movement of such studs as one with the segments.

Springs *k k* are provided in the body of the pulley for exerting forces on the segments tending to maintain them in their contracted relations.

Each spring comprises an intermediate coil or coils 10, and divergent leg members 12 and 13.

One leg member 12 of each spring engages the outer one *a* of the concentric flanges while the inner leg member 13 of the spring engages the stud *i* of one of the segment shanks.

F represents a tapered or substantially conical member which is slidable axially on the shaft C and coacts with the inner end of the segment shanks for causing the expansion of the pulley or for permitting of its contraction.

The inner ends of the segment shanks *h* are beveled as shown in Fig. 1, and the expanding element F instead of being in the form of a true cone has flattened radiating and divergent surfaces *m m* as indicated in Fig. 3.

Therefore, while the pulley, usually mounted to rotate freely on the shaft, will cause through the engagement of its segment shanks with the cone, the concurrent rotation of the latter as is regarded as a desirable capability in this pulley.

The cone is inwardly forced by the nut G which has a threaded engagement on the extremity of the shaft; but such screw threaded extremity is formed with a spline groove $o$, and a collar $p$ is interposed between the nut and the outer end of the cone which is non-rotative relatively to the latter by reason of the engagement of the feather or spline $q$ thereof in the spline groove $o$ in the shaft.

In order to afford the expansion pulley with a trough like rim within which the belt may run the flat annular sections A and B of the body have oppositely extended circumferential rim-like portions $r$ provided at their outer corners with parallel or substantially parallel outwardly extending flanges $s$ in planes at right angles to the axis of the pulley.

The expansible pulley is represented as having a driving connection with the shaft X which is understood as mounted for rotation in an invariable line. This shaft, for instance, may be one comprised in a textile machine, the same having a spur gear wheel L thereon driven by a pinion M on the hub $A^2$ of the pulley.

The pinion is in many cases interchangeable and to be replaced by one of greater or less diameter as occasion may require.

The expansible pulley must necessarily be bodily adjustable in accordance with its expansions or contractions as well also as with the interchanging of the gear wheel M; and, therefore, the supporting means for the pulley are provided as follows:—

N represents a support having a sleeve or a collar at its upper end to embrace the shaft for suspension therefrom of such support. This support has associated therewith a longitudinally distensible bar-like member $N^2$, the same being provided with a longitudinal slot $t$ engaged through which is the clamping bolt $u$ having the confining nut $u^2$.

P represents a substantially horizontal bracket adapted for attachment to the frame of the same machine of which the shaft X is a part, which is provided with an arcuate slot $v$ generated from the axis of the shaft X from which the distensible support M is hung.

The pulley supporting shaft or stud C is supported by the distensible member $N^2$. Said member $N^2$ passes transversely of and in facewise relation to the intermediate portion of the bracket and its proximate portion as to its vertical slot $w$.

$x$ represents a headed clamping bolt, the shank of which passes through the arcuate slot, and the slot $w$, and has the lever nut $y$ for binding the parts $N^2$ and P firmly together in their properly adjusted relations.

Assuming that the pulley has been contracted or expanded from a previous condition: The lever nut $y$ will be loosened, and the distensible support N, $N^2$ will be swung from the shaft X as the center to establish proper belt conditions, and the parts will then be reëngaged.

In cases where the pinion M is interchanged for a larger or smaller one, the member $N^2$ will be adjusted up or down as occasion requires and as permitted by the provision of the slots $t$ and $w$.

In order to get additional scope of adjustment, the supporting member N has a slot $t^2$ as well as the slot $t$ in the member $N^2$.

The member $N^2$ has opposite edge flanges $z$ $z$ to form an intermediate longitudinal channel so that the parts N and $N^2$ will be maintained at all times in longitudinal alinement.

The provision of the vertical slots in the extensible bar-like members N and $N^2$ in conjunction with the arc shaped slot in the bracket and the means for clamping the respective parts in their desired relations also renders the mounting of the support on different machines or in different situations a matter of entire convenience.

I claim:—

1. A shaft and a pulley body mounted thereon, said body comprising a flat annular section having concentric outer and inner flanges provided with guide recesses in radial lines, and a second flat annular section spaced from the first section by said flanges, and means for detachably uniting the two sections, rim-forming segments having shank members slidably guided in the said recesses in the aforementioned flanges, springs exciting inward forces on the segment shanks, a conical member slidable axially on the shaft and having an expanding coaction with the inner ends of the segment shanks, and a nut screwing on the shaft and adapted to exert an endwise forcing action to the cone.

2. A shaft and a pulley body mounted thereon, said body comprising a flat annular section having concentric outer and inner flanges provided with guide recesses in radial lines, and a second flat annular section spaced from the first section by said flanges, and means for detachably uniting the two sections, and said flat annular sections having oppositely extended circumferential rim-like portions, provided with flanges parallel to each other and in planes at right angles to the pulley axis, segments to form an expansible rim in the pulley between said parallel flanges having shank members slidably guided in the said recesses in the aforementioned flanges, springs exerting inward forces on the segment shanks, a conical member slidable axially on the shaft and co-acting with the inner ends of the segment shanks, and a nut screwing on the shaft and adapted to exert an endwise forcing action to the cone.

3. A shaft and a pulley body mounted thereon, said body comprising a flat annular section having concentric outer and inner flanges provided with guide recesses in radial lines, and having bosses provided with screw threaded holes, between the radial lines of arrangement of the recesses, and a second flat annular section spaced from the first section by said flanges, and screws engaged in said bosses for detachably uniting the two sections, rim forming segments having shank members slidably guided in the said recesses in the aforementioned flanges, and provided with transversely projecting studs, springs comprising an intermediate coil to be engaged around said bosses, and divergent leg members, one thereof of each spring engaging the outer one of the concentric flanges and the said inner one engaging the stud of one of the segment shanks, a conical member slidable axially on the shaft and coacting with the inner ends of the segment shanks, and a nut screwing on the shaft and adapted to exert an endwise forcing action to the cone.

4. A shaft and a pulley body mounted thereon, said body comprising a flat annular section having concentric outer and inner flanges provided with guide recesses in radial lines, and having protruding bosses provided with threaded holes, and a second flat annular section spaced from the first section by said flanges, and screws engaged in said bosses and with said second section for detachably uniting the two sections, and said flat annular sections having oppositely extended circumferential rim-like portions, provided at their outer edges with flanges parallel to each other and in planes at right angles to the pulley axis, segments to form an expansible rim in the pulley between said parallel flanges having shank members slidably guided in the said recesses in the aforementioned concentric flanges, and provided with transversely extended studs, a series of springs, each comprising a coiled intermediate portion to be engaged around said bosses, and divergent leg members, one of which engages the other one of the concentric flanges while the inner one engages the stud of one of the segment shanks for inward forces thereagainst, a conical member slidable axially on the shaft and coacting with the inner ends of the segment shanks, and a nut screwing on the shaft and adapted to exert an endwise forcing action on the cone.

5. The combination with the shaft of a machine, of a support hung from said shaft, an expansible pulley mounted on said support, and driving connections between said pulley and the shaft, and a bracket adapted for attachment to the frame of the machine provided with a slot having the form of an arc generated from the axis of the shaft, a clamping bolt, engaging said bracket, extending through the slot therein, and through said support, and a clamping nut screw engaging on the shank of said bolt.

6. The combination with the shaft of a machine, having a driving gear wheel thereon, of a support, hung from said shaft, and comprising a longitudinally distensible bar-like member, a shaft mounted on said distensible support and provided with an expansible pulley, having an interchangeable pinion in mesh with said gear wheel, and a bracket adapted for attachment to the frame of the machine provided with an arc slot generated from the axis of the first named shaft, a clamping bolt engaging said bracket extending through the arc slot therein, and through a slot formed longitudinally in an adjacent portion of the distensible bar-like member, and a clamping nut screw engaging on the shank of said bolt.

Signed by me at Springfield, Mass., in presence of two subscribing witnesses.

EDWARD WITT.

Witnesses:
G. R. DRISCOLL,
WM. S. BELLOWS.

Copies of this patent may be obtained for five cents each, by addressing the "Commissioner of Patents, Washington, D. C."